Figure 1:
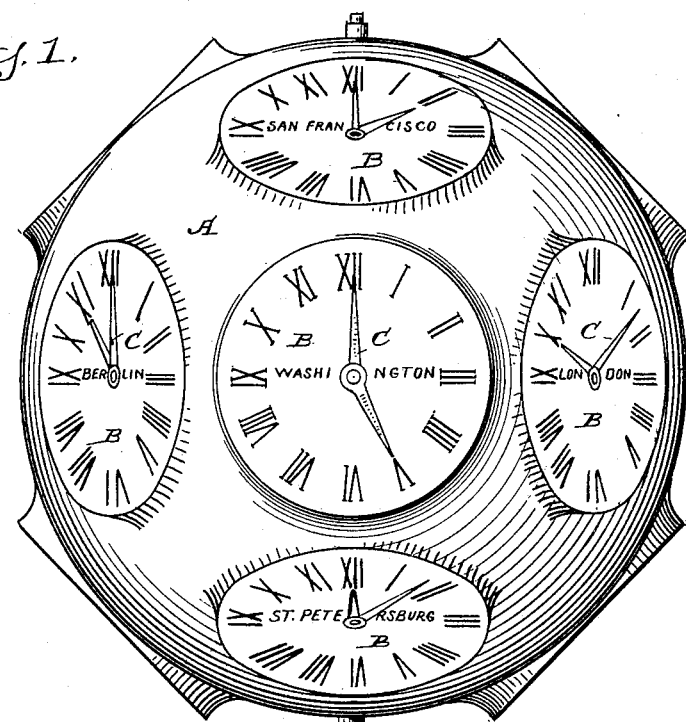

No. 650,454. Patented May 29, 1900.
L. J. DIRAND.
GEOGRAPHICAL TIME GLOBE.
(Application filed July 20, 1899.)

(No Model.) 2 Sheets—Sheet 1.

WITNESSES
H. A. Lamb
N. Elwood

INVENTOR
Louis J. Dirand
By
A. M. Wooster
Atty.

No. 650,454. Patented May 29, 1900.
L. J. DIRAND.
GEOGRAPHICAL TIME GLOBE.
(Application filed July 20, 1899.)

(No Model.) 2 Sheets—Sheet 2.

WITNESSES
H. A. Lamb
N. Elwood

INVENTOR
Louis J. Dirand
By A. M. Wooster
Atty

UNITED STATES PATENT OFFICE.

LOUIS J. DIRAND, OF TORRINGTON, CONNECTICUT.

GEOGRAPHICAL TIME-GLOBE.

SPECIFICATION forming part of Letters Patent No. 650,454, dated May 29, 1900.

Application filed July 20, 1899. Serial No. 724,442. (No model.)

*To all whom it may concern:*

Be it known that I, LOUIS J. DIRAND, a citizen of the United States, residing at Torrington, county of Litchfield, State of Connecticut, have invented a new and useful Clock Attachment for Indicating the Time at Different Places, of which the following is a specification.

My invention has for its object to provide an attachment adapted for use with any ordinary or preferred spring, weight, or electric time mechanism for the purpose of indicating the correct time at a number of different places simultaneously—for example, at a number of the principal capitals or leading cities of the world or at the different capitals of Europe or at a number of the capitals or principal cities of the United States or at a number of different locations in a railway system.

With these ends in view I have devised the novel time attachment of which the following description, in connection with the accompanying drawings, is a specification, reference characters being used to denote the several parts.

Figure 5:
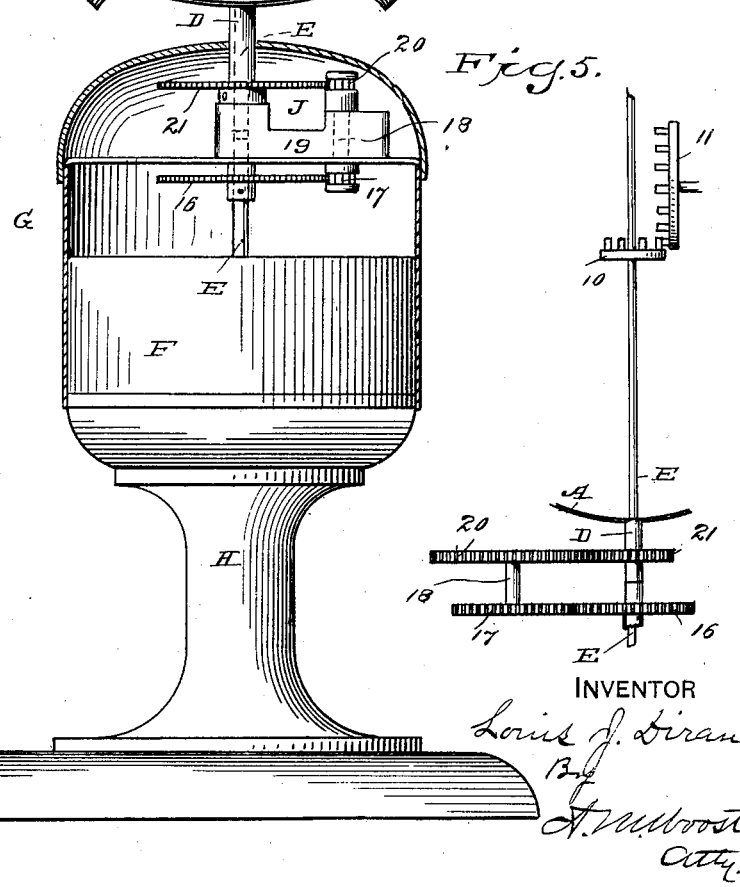
Figure 2:
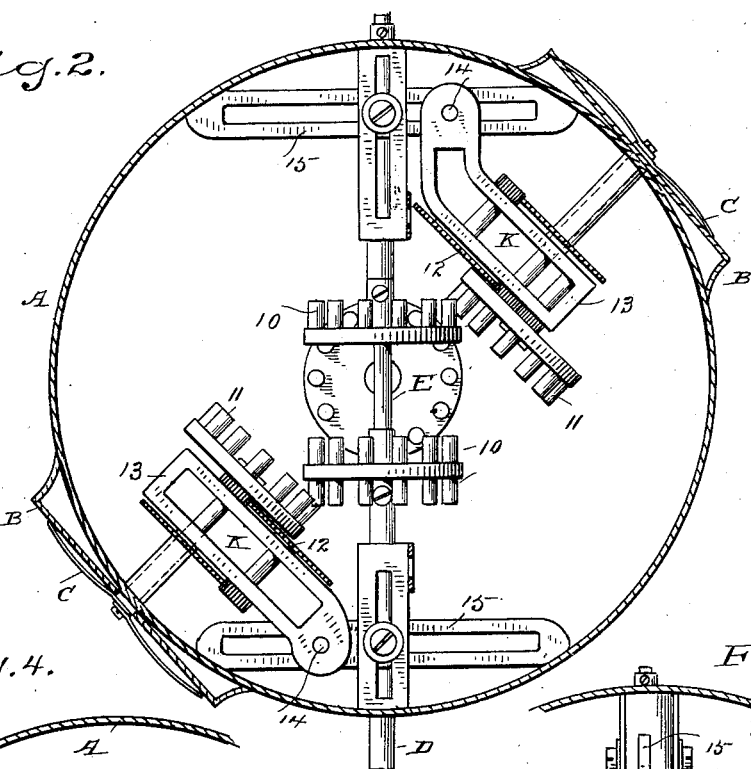
Figure 4:
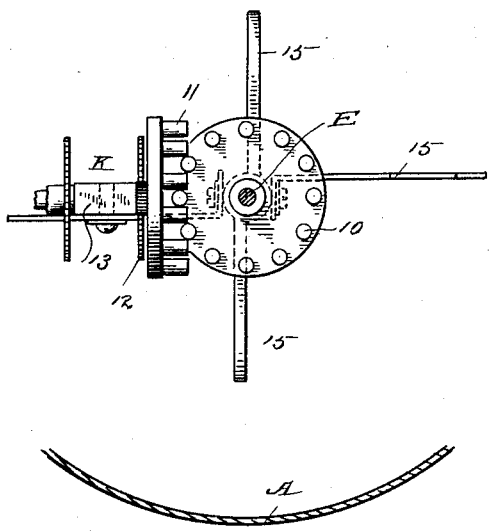
Figure 3:
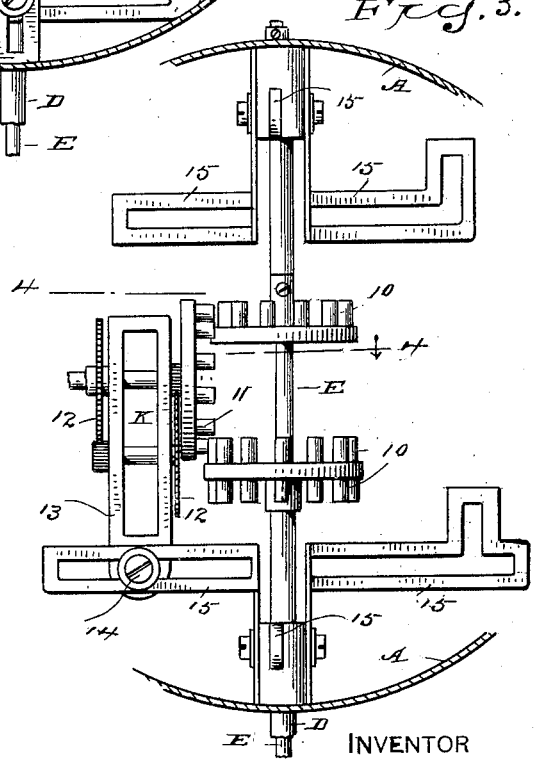

Figure 1 is an elevation, partly in vertical section, illustrating the principle of my invention carried into practical effect; Fig. 2, a vertical section of a globe, illustrating mechanisms by which different sets of pointers are actuated; Fig. 3, a section similar to Fig. 2, the point of view being at right angles to the point of view in Fig. 2; Fig. 4, a section on the line 4 4 in Fig. 3 looking down; and Fig. 5 is a diagrammatic view illustrating a form of my invention in which the globe is caused to rotate twice during each hour, the pointers upon the dials keeping accurate time the same as when the globe remains stationary or makes a complete rotation in an even hour.

A denotes a globe having upon its surface a number of dials B and corresponding sets of pointers C.

D denotes a sleeve to which the globe is rigidly secured, and E a shaft which may or may not extend upward continuously through both the sleeve and the globe. Either the shaft or the sleeve may have motion imparted to it in any suitable manner, as by a clock-movement, one only of said parts rotating, the other remaining stationary.

The special size, number, and arrangement of the dials upon the surface of the globe is not of the essence of my invention. For example, the surface of the globe may bear an accurate map of the earth, and if the globe is relatively large and the dials relatively small the dials may be placed upon the countries whose time or the time of whose capital cities it is desired to indicate upon the dials, it being of course obvious that the shaft and the sleeve and the mechanism for rotating either of them may be placed at an angle, so as to correctly indicate the inclination of the axis of the earth to the plane of its rotation about the sun. In Fig. 1 I have illustrated a globe adapted to exhibit upon its surface fourteen dials. It is obvious, however, that a larger or a smaller number of dials or a different arrangement of dials may be used without departing from the principle of my invention. As a matter of fact the only limit to the number and arrangement of dials that may be used in connection with a globe of any required size is the capacity of the globe to accommodate the several pointer-operating mechanisms, as will be more fully explained. In the present instance five dials appear clearly in front view, said dials indicating approximately the correct time in Washington, London, Berlin, St. Petersburg, and San Francisco. For example, it being five o'clock p. m. at Washington, it will be eight minutes past ten p. m. in London, one minute past eleven p. m. in Berlin, nine minutes past twelve a. m. in St. Petersburg, and fifty-nine minutes past one p. m. at San Francisco.

In the drawings I have indicated that the motive power for either the sleeve or the shaft is furnished by a clock-movement F, which is inclosed in a shell G, supported by a standard H. In addition to the clock-movement there is inclosed within the shell a mechanism J, the purpose of which I shall presently explain.

K (see Figs. 2, 3, and 4) denotes the pointer-operating mechanisms, which are located within the globe. Each of these mechanisms consists, essentially, of a driving gear-wheel 10, fixed to shaft E, and a driven gear-wheel 11 and train of gearing 12, carried by a bracket 13. In the drawings I have illustrated pin-gears in use as the driving and driven gear-wheels 10 and 11 and preferably use pin gear-wheels for this purpose, although other styles of gear-wheels may be used, if preferred. The trains of gearing, which are designated as a whole by 12, are simple ordinary trains, the sole requirements being that a shaft or sleeve carrying a minute-hand be given an entire revolution every hour and a shaft or sleeve carrying an hour-hand be given an entire revolution every twelve hours. The brackets 13, by which the pointer-operating trains of gearing are carried, are locked by set-screws 14 to slotted brackets 15, some of which are rigidly secured to the inner side of the globe and others of which are attached by set-screws to other brackets, which are themselves rigidly secured in place. In Figs. 2, 3, and 4 for the sake of clearness of illustration I have shown a limited number only of pointer-operating trains of gearing. It will be obvious, however, that the use of single or double pin-gears and the number and arrangement of the several trains of gearing and the brackets by which they are supported will depend in each instance upon the requirements of the special use for which the device is intended and the taste and skill of the manufacturer. It will be apparent that where either sleeve D or shaft E is caused to rotate once an hour, the other member remaining stationary, the mechanism which I have indicated as a whole by J is unnecessary and, furthermore, that it is wholly immaterial which of the gear-wheels 10 or 11 or if one or both of them rotate. In the form in which the sleeve and globe are held stationary the shaft carrying gear-wheels 10 revolves and through engagement of the several gear-wheels 10 with the gear-wheels 11 communicates movement to the several pointer-operating trains of gearing. In the form in which the shaft and the gear-wheels 10 are held stationary and the sleeve and globe are caused to rotate the gear-wheels 11, which are in mesh with the gear-wheels 10 upon the shaft, in addition to being carried around with the globe will also have axial movement imparted to them through their engagement with gear-wheels 10 and will thus impart motion to the pointer-operating trains. In order to provide, however, for imparting two or more rotations to the globe during each hour, or, if preferred, a single rotation of the globe in a longer period of time than an hour, the pointers continuing to indicate accurate time, as before, I provide the mechanism in the shell, which I have indicated as a whole by J. This mechanism consists, essentially, of a gear-wheel 16, which receives power from the clock-movement and may or may not be rigidly secured to shaft E and which meshes with a pinion or gear-wheel 17 on a shaft 18, journaled in a suitable bracket 19, and carrying another pinion or gear-wheel 20, which engages a gear-wheel 21, rigidly secured to sleeve D. In Fig. 1 I have shown a form of mechanism J in which the gear-wheels 16 and 21 and pinions 17 and 20 are the same size, so that there is no change of speed. In this form the shaft E may be in two parts, the upper part, which supports the sleeve and globe, being stationary and being suitably stepped in bracket 19. In this form the power of the clock-movement or other motor is applied to the shaft and is communicated through mechanism J to the sleeve and globe, so that the latter will rotate upon the upper portion of the shaft, which merely serves as a support therefor. In Fig. 5, which is a diagrammatic view only, I have illustrated a form of mechanism J designed to cause the globe to make two complete revolutions in an hour. In this form it will be noticed that gear-wheels 16 and 17 are the same size. Where it is required that the globe make more than one revolution in an hour—for example, two revolutions in an hour—gear-wheels 20 and 21 are made of such size relatively to each other that the latter will make two complete revolutions during one revolution of the former. It will be noted, furthermore, that wheels 10 and 11 are of such size relatively to each other, the wheel 11 having double the number of teeth of the wheel 10, that the shaft and wheel 10 being stationary the globe and wheel 11 will make two entire revolutions about the shaft and wheel 10 while wheel 11 is making one axial rotation, so that the operation of the trains of mechanism which carry the pointers will be the same as in the other form.

Having thus described my invention, I claim—

1. A clock attachment for indicating time at different places consisting of a globe, a sleeve by which the globe is carried, a shaft on which the sleeve is mounted, dials and corresponding sets of pointers upon the outer surface of the globe, gear-wheels carried respectively by the shaft and the globe, pointer-operating trains actuated by said gear-wheels the shaft and sleeve constituting relatively-movable parts, and means for rotating one of said parts relatively to the other.

2. The combination with the shaft and a globe mounted thereon and having on its surface dials and sets of pointers, of a plurality of gear-wheels 10 carried by different portions of the shaft, gear-wheels 11 carried by the globe, trains of gearing intermediate said gear-wheels and the pointers, the shaft and globe constituting relatively-movable parts, and mechanism for rotating one of said parts relatively to the other.

3. The combination with the shaft and a globe mounted to turn thereon and having on its surface dials and sets of pointers, of a plurality of gear-wheels 10 carried by different portions of the shaft, gear-wheels 11 carried by the globe, trains of gearing intermediate said gear-wheels and the pointers, and mechanism for imparting rotary movement to the globe.

4. The combination with the shaft and a globe mounted to turn thereon and having on its surface dials and sets of pointers, of a plurality of gear-wheels 10 carried by different portions of the shaft, gear-wheels 11 carried by the globe and having double the number of teeth, trains of gearing intermediate said gear-wheels and the pointers, and a mechanism J whereby the globe is caused to rotate twice during each rotation of the shaft of the time-movement, the pointers continuing to indicate correct time.

5. The combination with the shaft, a globe mounted thereon and mechanism for turning one of said parts relatively to the other, of dials and sets of pointers upon the surface of the globe, trains of gearing intermediate said pointers and the shaft, and a plurality of brackets secured at varying angles to the inner side of the globe by which the pointer-operating trains of gearing are carried.

In testimony whereof I affix my signature in presence of two witnesses.

LOUIS J. DIRAND.

Witnesses:
EMILE F. FILIERE,
PAUL A. PFEIFFER.